Figure 1:
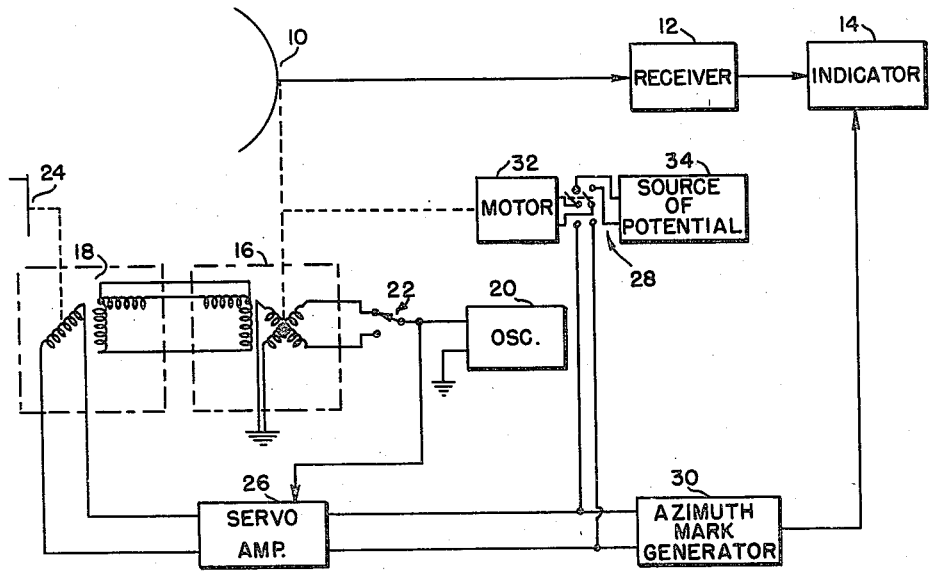

Jan. 19, 1954

B. CHANCE ET AL 2,666,914

RADIO COURSE INDICATING SYSTEM

Filed Feb. 18, 1946

*INVENTORS.*
BRITTON CHANCE
IVAN A. GREENWOOD JR.

BY

*William D. Hall.*
ATTORNEY

Patented Jan. 19, 1954

2,666,914

UNITED STATES PATENT OFFICE 2,666,914

RADIO COURSE INDICATING SYSTEM

Britton Chance, Cambridge, and Ivan A. Greenwood, Jr., Boston, Mass., assignors, by mesne assignments, to the United States of America as represented by the Secretary of War Application February 18, 1946, Serial No. 648,532

5 Claims. (Cl. 343—5)

This invention relates to a navigation system for use in aircraft or similar moving carriers employing a radar or radio object locating system and more particularly to apparatus for providing markers on the indicator of the radar system which may be used as an aid in the directing of the aircraft along a prescribed course.

In the copending application of Ivan A. Greenwood, Jr., Serial No. 623,402, entitled "Electrical Apparatus," filed October 19, 1945, now Patent No. 2,633,570, apparatus is disclosed which, together with two radio beacons which are responsive to signals from a radar system, provides the data necessary to navigate an aircraft along a hyperbolic course or along a so-called "cat and mouse" course to a predetermined point. The predetermined point may be a precalculated bomb release point or it may be any other desired destination such as an airport. The hyperbolic course is normally flown by maintaining a constant time or range difference between signals received by the aircraft radar system from the two beacons. The time or range difference determines the specific hyperbola along which the aircraft is flown. The cat and mouse course is flown by flying around one radio beacon, called the cat beacon, at a constant predetermined range until the aircraft is within a predetermined range of the second beacon called the mouse beacon.

To fly a cat and mouse course with apparatus of the type disclosed in the above cited copending application, the aircraft is first directed on such a course that the cat beacon is approached or flown away from until its return signal coincides with a preset cat range mark on the cathode ray tube indicator of the radar system. The plane is then directed along a circular course around the cat beacon as indicated by coincidence of the cat beacon response and the cat range marker on the indicator. Such a course is continued until the mouse beacon response coincides with a preset mouse range marker at which time the aircraft is at the preselected point. The above-mentioned system provides information as to lateral displacement of the aircraft from its course but errors in direction of travel are apparent only after an appreciable displacement error is produced.

It is an object of the present invention therefore to provide apparatus for presenting on the indicator of a radio object locating system a marker which is normal to the ground track of the aircraft and which may be used to give a continuous indication of whether or not the aircraft is flying a circular course around the cat beacon.

It is another object of the present invention to provide apparatus for presenting on the indicator of a radio object locating system a marker indicative of the ground track of the aircraft.

It is a still further object of the present invention to provide apparatus for presenting on the indicator of a radio object locating system two markers so displaced that, when the aircraft is flown so that the markers intersect the respective responses from the two guide beacons, the aircraft is flying a hyperbolic course.

Figure 2:
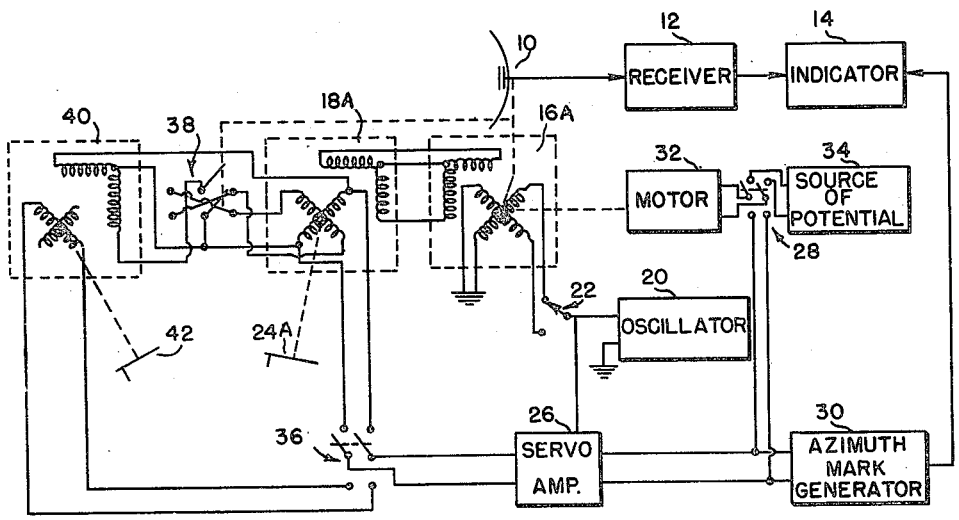

For a better understanding of the invention together with other and further objects thereof reference is had to the following description which is to be read in connection with the accompanying drawing in which:

Fig. 1 is a diagram in schematic and block form illustrating one embodiment of the present invention; and Fig. 2 is a diagram in schematic and block form illustrating a second embodiment of the present invention.

Referring now to the drawing and more particularly to Fig. 1 thereof there is shown apparatus for generating selectively either a ground track mark or a "normal to ground track mark" to aid in the navigation of an aircraft to a predetermined destination by flying a so-called cat and mouse course. In Fig. 1 an antenna 10, which forms a part of a radar or radio object locating system, portions of which are not shown, is electrically connected to a receiver 12 which is in turn electrically connected to a cathode ray tube indicator 14. The receiver 12 and indicator 14 also form a part of the radar system. The radar system is of a type such that the presentation on the indicator 14 is amplitude modulated due to the Doppler effect on signals returned by surrounding objects. A radio object locating system of the required type is disclosed and claimed in the copending application of Rubby Sherr, Serial No. 624,907, entitled "Communication System," filed October 26, 1945. The indicator 14 is preferably of the plan position indication (P. P. I.) type in which a presentation of all objects within the range of the radar system is plotted in polar coordinate form. Preferably the presentation on the indicator 14 is provided with azimuth stabilization relative to some fixed direction such as true or magnetic north.

The antenna 10 is mechanically connected to the rotor of a rotary position translating or a so-called synchro device 16. The term "synchro" will be used subsequently when referring to such a device. The synchro device 16 is preferably of the type having two stator windings which are physically displaced by 90 degrees and which has two rotor windings physically displaced by 90 degrees. An oscillator 20 is selectively connected through a suitable switch 22, shown in Fig. 1 as a single-pole double-throw switch, to the two rotor windings of the synchro device 16. The frequency of oscillation of the oscillator 20 is preferably in the audio range as for example 60, 400, or 1000 cycles per second. The stator windings of the synchro device 16 are electrically connected to the stator windings of a second synchro device 18 which is similar in construction to the synchro device 16. The rotor of the synchro device 18 may in fact have two windings thereon as described, although only one is here shown. The rotor of the synchro device 18 is mechanically connected to an adjusting handwheel 24. The rotor winding of the synchro device 18 is electrically connected to the input of a servo amplifier 26 which is also connected to the oscillator 20. The servo amplifier 26 may be any device well known in the art capable of comparing the voltage derived from the synchro device 18 with the reference voltage obtained from the oscillator 20 to provide a D.-C. output voltage which is indicative in polarity and magnitude of the error in effective angular position existing between the antenna 10 and the handwheel 24. Such a device will normally include a phase and amplitude detector and suitable D.-C. amplifiers or relays. The D.-C. output from the servo amplifier 26 is connected to two terminals of a double-pole double-throw switch 28 and to an azimuth mark generator 30. The common terminals of the switch 28 are connected to a motor 32 which is mechanically connected to the antenna 10. The remaining two terminals of the switch 28 are connected to a source of potential 34. The azimuth mark generator 30 may be any circuit capable of generating a suitable voltage which is applied as an intensifying signal to the indicator 14 at those instants of time when the output from the servo amplifier 26 passes through a zero value. For example, the azimuth mark generator 30 may be of a type similar to that disclosed and claimed in the copending application of Richard N. Close, Serial No. 644,167 entitled "Electromechanical Apparatus," filed January 29, 1946.

In the cited copending application of Rubby Sherr it is shown that the video signals which are applied to the indicator 14 by the receiver 12 are inherently amplitude modulated due to the Doppler effect and further that the frequency of this amplitude modulation is a minimum when the antenna of the radar system is pointing in the actual direction of travel of the aircraft. This direction coincides with the ground track of the aircraft.

During operation the switch 28 is placed in the down position, thus connecting the motor 32 to the output of the servo amplifier 26. The switch 22 is placed in the up position. Rotation of the handwheel 24 will cause the antenna 10 to be positioned in accordance therewith due to the well known action of the synchro devices 16 and 18 in conjunction with the oscillator 20 and the servo amplifier 26. The antenna 10 is positioned by rotation of the handwheel 24 until the frequency of amplitude modulation of the returned signals received by the antenna 10 is visually observed on the indicator 14 to be a minimum. Other means for indicating the minimum frequency may be employed if desired, for example a meter, not shown, may be associated with the receiver to indicate by appropriate needle deflection the frequency of the amplitude modulation of the returned signals. The antenna 10 is then positioned by observation of the meter. The antenna 10 is now pointing in the actual direction of travel of the aircraft and therefore in the direction of the ground track of the aircraft. Without further disturbing the position of the handwheel 24 the switch 28 is placed in the up position, thus connecting the motor 32 to the source of potential 34 resulting in rotation of the antenna 10 continuously in one direction.

The output of the servo amplifier 26 will now be a substantially sinusoidal voltage having a repetition rate equal to the rotational speed of the antenna 10. This output voltage is applied to the azimuth mark generator 30 which produces a suitable voltage pulse for application to the indicator 14 at each time the output from the servo amplifier 26 passes through zero. To those skilled in the art it will be obvious that the servo amplifier output is zero at each succeeding time the antenna points in the direction of the ground track.

There is now produced on the indicator a distinguishable azimuth trace which is indicative of the ground track of the aircraft. Placing the switch 22 in the down position alters the phase of the energizing signal applied to the stator windings of the synchro 18 by 90 space degrees and therefore displaces the time of zero output from the servo amplifier 26 by 90 space degrees as measured in terms of rotation of the antenna 10. The distinguishable trace, hereinafter called the "normal" trace, which now appears on the indicator 14 will be displaced 90 space degrees from the ground track mark which is present on the indicator 14 when the switch 22 is in the up position.

In flying the cat and mouse course explained above, the aircraft is flown in a circular path around one of two radio beacons. With the aircraft flying a perfect circle about this so-called cat beacon, the ground track of the aircraft is tangent to the circular path and therefore a line drawn from the aircraft normal to the ground track thereof will pass through the cat beacon. When the pilot of the aircraft is not on the proper course the ground track of the aircraft will not be tangent to the proper circular path and a line drawn from the aircraft normal to the ground track will not pass through the cat beacon. The "normal" trace on the indicator 14 which is produced when the switch 22 is in the down position will therefore pass through the indication representing the cat beacon when the aircraft is on the proper course. The steerage of the aircraft is now properly determined by reference to the cat beacon indication and the "normal" trace, thus eliminating guesswork and the need for an appreciable lateral displacement of the aircraft from its course before error in steerage can be corrected.

Reference is now had to Fig. 2 of the drawing which illustrates an embodiment of the present invention in which provision is made for generating azimuth markers for presentation on a cathode ray tube indicator to aid in the navigation of an aircraft along either the cat and mouse course described above or along a hyperbolic course. In Fig. 2 parts which correspond to parts shown and described in connection with Fig. 1 are designated with like numerals. The apparatus shown in Fig. 2 includes all of the apparatus shown in Fig. 1 with certain additional equipment presently to be described, and further the portion of the apparatus of Fig. 2 which is identical to that shown in Fig. 1 operates in the manner hereinbefore described. The structure and operation of the apparatus of Fig. 2 will therefore be described only insofar as it differs from Fig. 1.

The synchro 18A must, in the apparatus of Fig. 2, have two rotor windings which are physically displaced by 90 degrees. A double-pole double-throw switch 36 is interposed between one of the rotor windings of the synchro device 18A and the servo amplifier 26 with the common terminals of the switch 36 being connected to the servo amplifier 26. The rotor winding of the synchro device 18A which is connected to the switch 36 is connected across one stator winding of the third synchro device 40. The remaining rotor winding of the synchro device 18A is connected through a reversing switch 38 to the remaining stator winding of the synchro device 40. The rotor of the synchro device 40 is mechanically connected to a handwheel 42 and the winding thereof (or one of the windings if the synchro device is identical with the synchro devices 16A and 18A) is electrically connected to the remaining two terminals of the switch 36. The switch 38 is actuated by mechanical association with the antenna 10 and is preferably switched at substantially the instant the antenna 10 points in the direction of the heading of the aircraft and at some later instant which is displaced from the first by at least 90 degrees of rotation of the antenna and preferably by 180 degrees.

The apparatus illustrated by Fig. 2 operates in the same manner as the apparatus of Fig. 1 to generate an azimuth mark which is normal to the ground track for use in navigating an aircraft along the so-called cat and mouse course. When the apparatus of Fig. 2 is providing this "normal" marker the switch 36 is in the up position with the result that the synchro device 40 is effectively inoperative although the stator windings are energized.

It can be shown either graphically or mathematically that to navigate the hyperbolic course described above after the proper hyperbolic course has been selected, it is sufficient if the ground track of the aircraft is caused to continually bisect the angle having the aircraft at the vertex and formed by two lines passing through the aircraft and the two radio beacons.

To navigate the hyperbolic course the switch 36 is placed in the up position thus connecting the input to the servo amplifier 26 to the synchro device 18A and the switch 28 is placed in the down position connecting the motor 32 to the output of the servo amplifier 26. The handwheel 24A is rotated until the frequency of the amplitude modulation of the signals observed on the indicator 14 reaches a minimum. The switch 28 is then placed in the up position connecting the motor 32 to the source of potential 34 resulting in continuous rotation of the antenna 10 in one direction. The switch 36 is now placed in the down position connecting the rotor winding of the synchro device 40 to the input to the servo amplifier 26. The output from the servo amplifier 26 will be sinusoidal in nature during each period of time the switch 38 is closed and will be shifted in phase by 90 degrees at the time the position of the switch 38 is changed. The position in time relative to the position of the antenna at which the output from the servo amplifier 26 passes through zero is determined by the position of the handwheel 42. Due to the fact that the position of the switch 38 is changed at substantially the time the antenna is pointing in the actual direction of motion of the aircraft and again 180 degrees later the output from the servo amplifier 26 will pass through zero four times during each revolution of the antenna 10. The four zero points will occur when the antenna is at some fixed angle relative to the ground track of the aircraft, occurring just before and just after the antenna reaches the ground track direction and just before and just after the antenna reaches a direction which is the back azimuth of the direction of the ground track. The angular difference between the position of the antenna when the output of the servo amplifier passes through zero and the position of the antenna when it points in the direction of the ground track of the aircraft is determined by the setting of the handwheel 42. It will be noted that the azimuth mark generator 30 will then generate four marker voltages which when applied to the indicator will produce four distinguishable traces thereon. The ground track of the aircraft will bisect the angle formed by two of the traces. The remaining two traces may be eliminated if desired by any means well known in the art, as for example by using a suitable cam and switch associated with the antenna 10. To navigate the aircraft along a hyperbolic course it is only necessary to fly the aircraft in such a direction that the two traces on the indicator 14 intersect the responses of the two radio beacons which determine the hyperbolic course. It is necessary to continuously adjust the position of the handwheel 42 so that the total angle between the two traces on the indicator is equal to the angular separation of the two beacons. This adjustment does not, however, affect the accuracy of the course flown.

In the preceding discussion of the present invention reference has been made solely to the use of synchro devices although it will be obvious to one skilled in the art that other data transmitting devices may be employed if desired. For example, the synchro devices may be replaced by suitably designed potentiometers.

Although the apparatus of the present invention is primarily designed for use in applications wherein the ground track of the aircraft is determined in the manner set forth in the cited copending application of Rubby Sherr it will be obvious that the direction of the ground track may be determined by other means and the data thus obtained properly set in on the handwheel 24 in Fig. 1 and the wheel 24A in Fig. 2. Furthermore the angle between the direction of the heading of the aircraft and the ground track thereof may be maintained correct automatically by suitable connection between the handwheel 24 and a stable gyro.

While there has been described what are at present considered the preferred embodiments of the invention it will be obvious that various changes and modifications, in addition to those set forth in the above specification, may be made therein without departing from the scope of the present invention.

What is claimed is:

1. In an aircraft, in combination with a radio object locating system adapted to exhibit the Doppler effect and having at least an antenna and an indicator, apparatus comprising first, second and third angular motion repeating devices each having first and second stator windings spaced in quadrature and further having first and second rotor windings spaced in quadrature, said first and second stator windings of said first repeating device being connected to said first and second stator windings of said second repeating device, the rotor of said first repeating device being connected mechanically to said antenna, first switching means mechanically connected to said antenna and interposed between the stator windings of said third repeating device and the rotor windings of said second repeating device and adapted to provide means for essentially reversing the phase of the signal applied from said second repeating device to one stator winding of said third repeating device, a signal source, second switching means adapted to selectively connect said signal source to said first or second rotor winding of said first repeating device, first and second handwheels connected mechanically to the rotors of said second and third repeating devices respectively, amplifier means for providing an output corresponding to the difference of two signals applied thereto adapted to receive a reference signal from said signal source, third switching means adapted to electrically connect the input to said amplifier means selectively to one of said rotor windings of said second repeating device or to one of said rotor windings of said third repeating device, driving means mechanically connected to said antenna, a power source, fourth switching means adapted to electrically connect the input to said driving means selectively to said power source or to the output of said amplifier means and a marker generating means electrically connected to said servo amplifier and to said indicator whereby azimuthal traces are provided on said indicator which may be used as an aid in the navigation of the aircraft, said traces being positioned in accordance with the selective positioning of said first, second, third and fourth switching means and in further accordance with the setting of said first and second handwheels.

2. In an aircraft, in combination with a radio object locating system adapted to exhibit the Doppler effect and having at least an antenna and an indicator, apparatus comprising first and second angular motion repeating devices, each having first and second stator windings physically spaced in quadrature, said first repeating device having first and second rotor windings spaced in quadrature, said second repeating device having at least one rotor winding, said first and second stator windings of said first repeating device being electrically connected to said first and second stator windings of said second repeating device, the rotor of said first repeating device being mechanically connected to said antenna, a signal source, first switching means adapted to selectively connect said signal source to said first or second rotor winding of said first repeating device, a handwheel connected mechanically to the rotor of said second repeating device, amplifier means for providing an output corresponding to the difference of two signals applied thereto electrically connected to said signal source and to the rotor winding of said second repeating device, driving means mechanically connected to said antenna, a power source, second switching means adapted to electrically connect the input to said driving means selectively to said power source or to the output of said amplifier means, and a marker generating means electrically connected to said amplifier means and to said indicator whereby azimuthal traces are provided on said indicator which may be used as an aid in the navigation of the aircraft, said traces being positioned in accordance with the selective positioning of said first and second switching means and in further accordance with the setting of said handwheel.

3. In an aircraft, in combination with a radio object locating system adapted to exhibit the Doppler effect and having at least an antenna and an indicator, apparatus comprising first, second and third data transmitting means, said first data transmitting means being mechanically connected to said antenna and being electrically connected to said second data transmitting means, said second data transmitting means being electrically connected to said third data transmitting means, signal generating means electrically connected to said first data transmitting means, means associated with said signal generating means and said first data transmitting means for selectively altering the effective phase of the signal transferred therebetween by 90 space degrees, means mechanically associated with said antenna and electrically associated with said second and third data transmitting means for selectively altering the effective phase of the signal transferred therebetween by 90 space degrees, first and second adjusting means respectively associated with said second and third data transmitting means and adapted to alter the space degree relation between the electrical inputs and outputs thereof, means for comparing two signals electrically connected to said signal generating means, said comparing means being adapted to provide an output control signal in accordance with the phase and amplitude of the input thereto relative to a signal from said signal generating means, means for causing said comparing means to be responsive to data derived selectively from said second or third data transmitting means, driving means mechanically connected to said antenna, a source of power, means for causing said driving means to be actuated selectively by said power source or by said comparator means, and means for producing a distinguishable azimuthal trace on said indicator in accordance with a predetermined characteristic of the output of said comparator means whereby said traces provide information which may be used as an aid in the navigation of the aircraft.

4. The combination with the receiver of a radio object locating system located on a moving craft and having at least a receiving antenna rotatable in azimuth and an indicator, means for rotating said antenna in azimuth, means for providing a sinusoidal signal in accordance with the azimuthal position of the antenna, means for initially phasing a node of said sinusoidal signal in time coincidence with the ground track position of the antenna, means connected to said signal providing means for shifting the phase of said sinusoidal signal by 90°, and means for applying said phase shifted signal to said indicator to supply an azimuth mark signal for said indicator in response to the nodes of said phase shifted signals whereby an azimuth mark indication may be obtained at right angles to said ground track position of the antenna.

5. The combination according to claim 4, further including means for increasing the number of nodes obtained from said sinusoidal signal for each revolution of the antenna, means for adjusting the phase angle between said antenna and said sinusoidal signal providing means, and means for switching said signal providing means over to said increasing means.

BRITTON CHANCE.
IVAN A. GREENWOOD, Jr.

References Cited in the file of this patent

UNITED STATES PATENTS

| Number | Name | Date |
|---|---|---|
| 2,223,224 | Newhouse | Nov. 26, 1940 |
| 2,403,562 | Smith | July 9, 1946 |
| 2,406,858 | Shepherd et al. | Sept. 3, 1946 |
| 2,412,670 | Epstein | Dec. 17, 1946 |
| 2,421,747 | Engelhardt | June 10, 1947 |
| 2,519,935 | Smith et al. | Aug. 22, 1950 |
| 2,529,823 | Starr | Nov. 14, 1950 |
| 2,547,363 | Bishop | Apr. 3, 1951 |
| 2,572,975 | Berger et al. | Oct. 30, 1951 |

FOREIGN PATENTS

| Number | Country | Date |
|---|---|---|
| 317,826 | Great Britain | May 29, 1930 |